Figure 1:
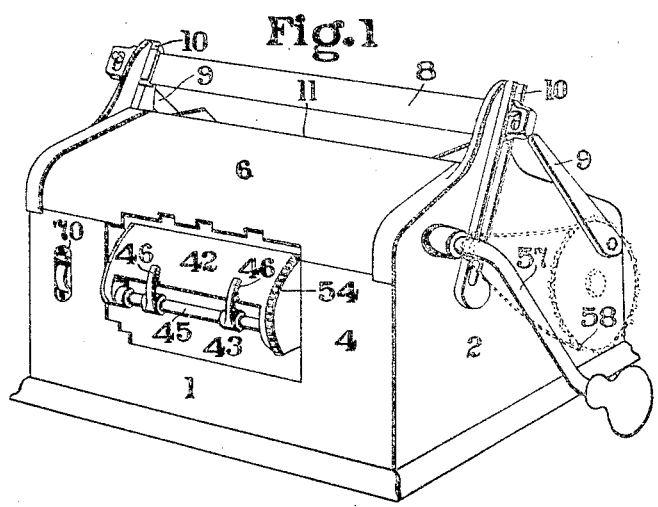

R. BURN.
FOLDING MACHINE.
APPLICATION FILED NOV. 16, 1911.

1,056,320.

Patented Mar. 18, 1913.
5 SHEETS—SHEET 1.

WITNESSES:
John C. Sanders
John A. Percival

INVENTOR
Robert Burn
BY
ATTY

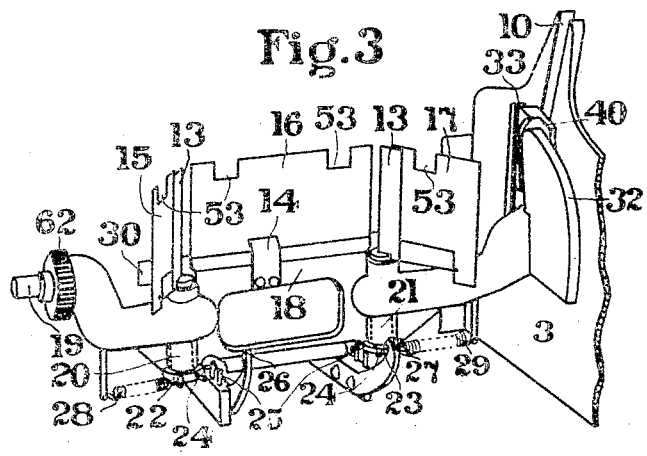
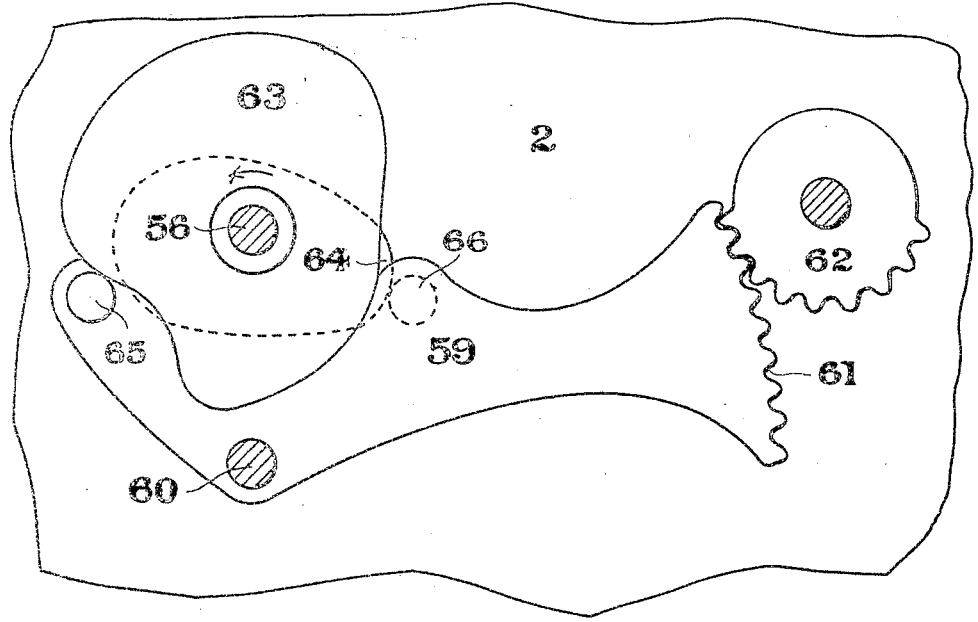

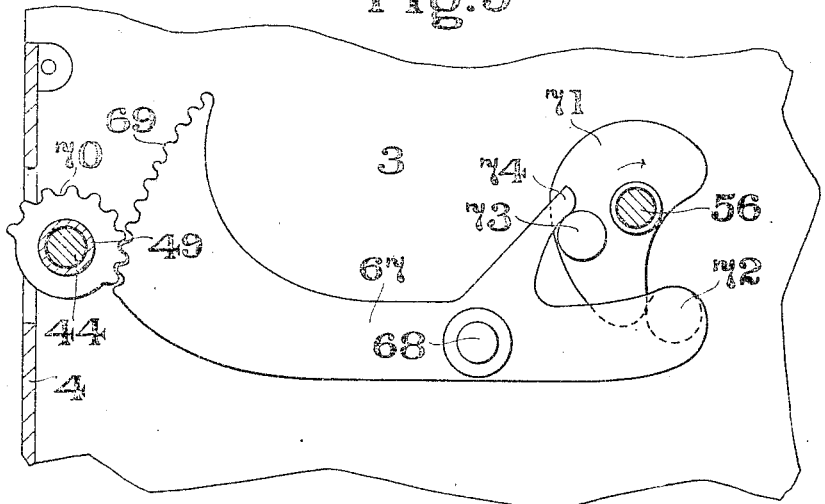
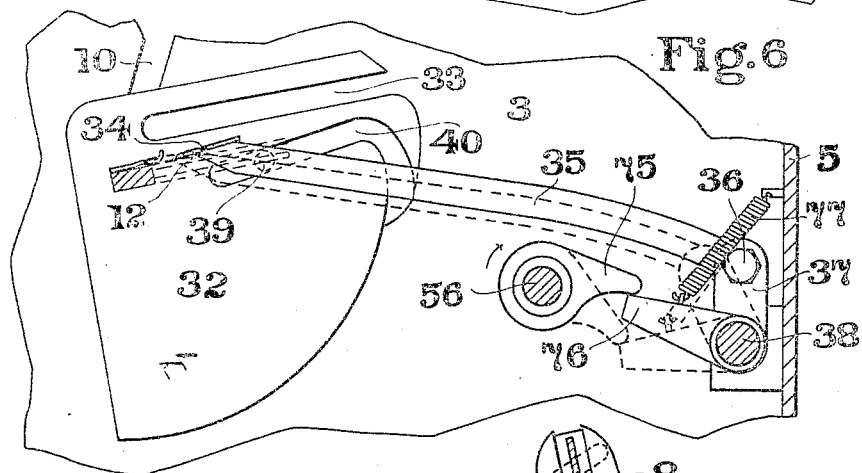
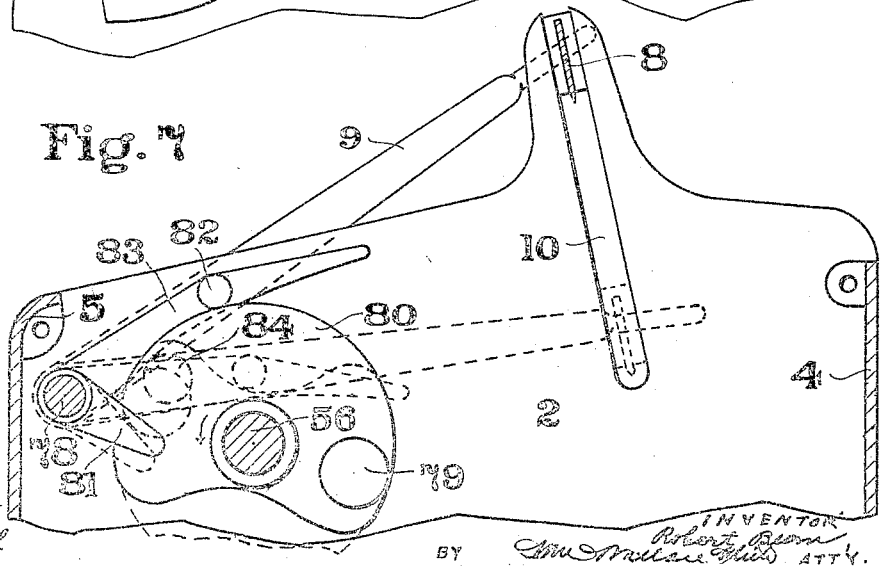

R. BURN.
FOLDING MACHINE.
APPLICATION FILED NOV. 16, 1911.

1,056,320.

Patented Mar. 18, 1913.

5 SHEETS—SHEET 4.

WITNESSES:
John C. Sanders
John A. Percival

INVENTOR:
Robert Burn

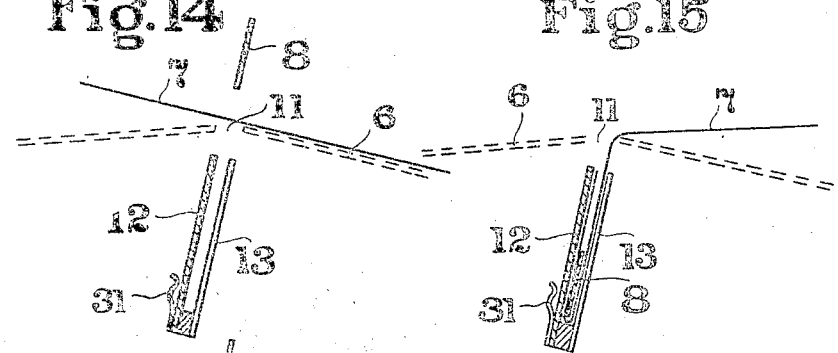
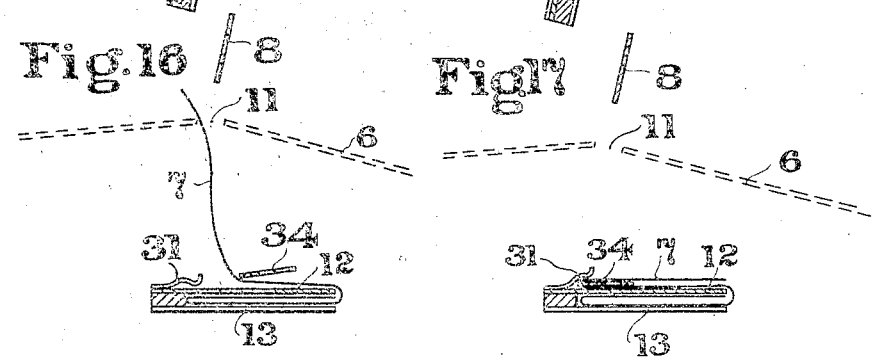
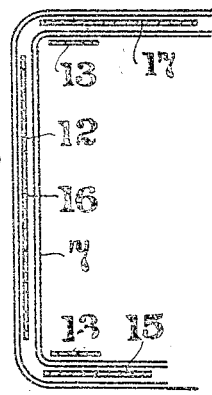
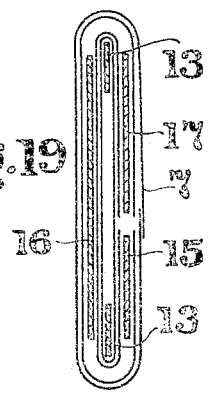

UNITED STATES PATENT OFFICE.

ROBERT BURN, OF PETONE, NEW ZEALAND.

FOLDING-MACHINE.

1,056,320.

Specification of Letters Patent.     Patented Mar. 18, 1913.

Application filed November 16, 1911. Serial No. 660,634.

*To all whom it may concern:*

Be it known that I, ROBERT BURN, a subject of the King of Great Britain, residing at 349 Jackson street, Petone, in the Province of Wellington and Dominion of New Zealand, have invented new and useful Improvements in Folding-Machines, of which the following is a specification.

This invention relates to a machine that has been designed for use in folding telegrams, statements, memoranda or other despatch forms.

Before referring to the invention, it will be explained in what manner the form is to be folded. This is done by first doubling over the bottom quarter of the depth of the sheet and turning its face in against the front of such sheet; then folding along the middle line of the sheet and turning the doubled portion in against the front face of the sheet; then folding the top quarter of the sheet backward so that its back will lie against the back of the already folded portion and thus complete a four fold of the sheet with the front face of the top quarter turned outward. After this the two ends of the folded form are turned back so as to lie against the back of the folds and are sealed in order to prevent the form unfolding.

To effect the sealing, it has been proposed to form the sheet with a pair of extensions or tabs having gummed backs and projecting laterally, one from either side of the upper or address portion. In lieu of this arrangement it has been proposed to provide a central tab extending upwardly from the upper edge of the sheet, or again tabs or stickers may be fed in or severed from a roll at the required moment, but it must be understood that no means or method forms any part of the present invention, although the means hereinafter described will serve effectively to press any sealing means down so as to adhere to the folded sheet.

Briefly the operation of the invention is as follows:—The sheet is received upon a table, forming the upper side of the machine and is engaged by a downwardly operating blade, which, carrying it through a slot forms the first or lower fold. The continuation of the movement places such folded portion of the sheet upon an upwardly disposed former of special construction, which is supported upon a carriage provided with a pair of laterally extending trunnions journaled in the sides of the casing. By this arrangement the carriage may be turned upon its said axis so as to deflect the former either forwardly or rearwardly. The second and third folds are then accomplished by deflecting the said former rearwardly, at which stage the rear face of the sheet is engaged by the forward stroke of a second blade. The former is then deflected in a forwardly direction, during which movement the two end portions of the folded sheet are doubled back upon the main portion thereof by a special action of the former itself. A special extracting device now comes into operation and withdraws the folded sheet from the former and in doing so presses the folds and delivers such sheet ready for despatch, without inclosing in an envelop.

In order that the nature of the invention may be fully understood, reference will now be made to the accompanying sheet of drawings in which:—

Figure 2:
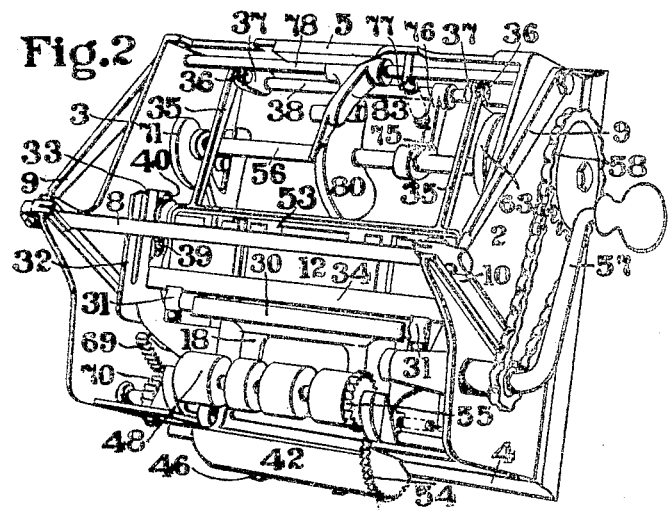
Figure 12:
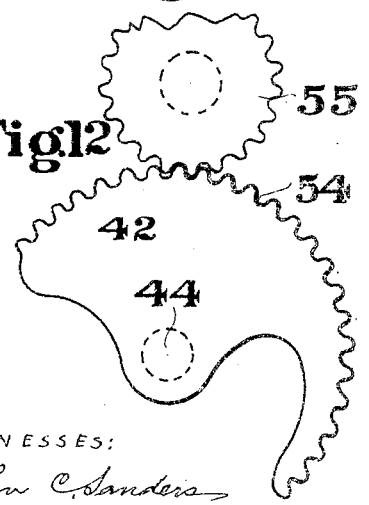
Figure 13:
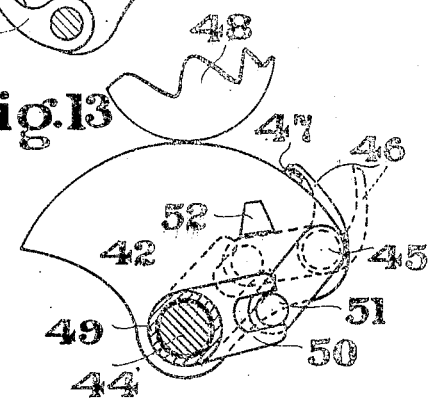

Figure 1.— is a perspective view of the outside of the machine, Fig. 2.— is a perspective view of the same with the cover removed and so placed as to show the internal parts in assembly, Fig. 3.— is an enlarged detail view showing in perspective the former with its plates in the act of swinging upon their spindles, Fig. 4.— is an enlarged detail of the means for obtaining the axial movement of the former. Fig. 5.— shows in enlarged detail, the actuating means for the ejector, Fig. 6.— is an enlarged detail view illustrating the operation of the second folding blade, Fig. 7.— is an enlarged detail view showing the mounting and method of operating the first folding blade, Figs. 8 to 11.— illustrate the working of the ejector, Fig. 12 shows the means for rotating the pressure rolls. Fig. 13.— illustrates the method of operating the ejector. Figs. 14 to 17.— are diagrams illustrating in sectional elevation the method of forming the quarter folds, and Figs. 18 and 19.— are diagrams, arranged planwise, showing the method of forming the end folds.

1 is a framework or casing comprising a pair of side plates 2 and 3 and a pair of end plates 4 and 5. The upper side of the casing is inclosed by a plate 6 constituting a table upon which the sheet 7 is laid with its written side uppermost and with its address portion toward the rear or end plate 5 of the casing. While in this position (Fig. 14) a blade 8 descends upon the sheet 7 at a line approximately a quarter of the height of the sheet from its lower edge, or edge toward the end plate 4 and is adapted to form the first fold by doubling such lower quarter back upon the remainder of the sheet. To effect this the said blade 8, which is actuated by a pair of arms 9 and is guided in slots 10, formed in the side plates 2 and 3, carries the engaged portion of the sheet downward through a transversely disposed slot 11 in the table 6. The engaged portion of the sheet is deposited by the blade 8 against the rear face of an upwardly disposed former 12 (Fig. 15) in which position the sheet is supported by a pair of narrow blades or strips 13, secured parallel with the former 12 and at the required interval from its rear face. Thus the blade 8 passes downwardly between the former 12 and blades 13. A leaf-spring 14 is arranged upon the rear face of the former 12 to retain the sheet in place and prevent its being withdrawn by the upward return movement of the blade 8.

The former (Fig. 3.) comprises three plates 15, 16 and 17 each of a height equal to the desired depth of the fold and approximating to a quarter of the length of the sheet and collectively of the required width of the sheet. The plates are mounted in line upon a horizontal carriage 18, having laterally projecting trunnions 19 journaled in the side plates 2 and 3, so as to be capable of oscillating upon such trunnions for the purpose of deflecting the former 12 forwardly or rearwardly as required.

The main or central plate 16 is secured permanently upon the carriage 18, while the narrower, or flanking plates 15 and 17 are adapted either to extend in line with, or to fold upon the rear side of the central plate, for a purpose hereinafter explained. To this end the said plates 15 and 17 are mounted upon spindles 20 and 21, respectively, which extend through bearings formed in the carriage 18 at points adjacent to and in line with the inner edges of such plates. To control this hinging action of the plates, disks 22 and 23, each provided with radial pegs 24, are secured upon the reverse ends of the spindles. While the former 12 is in the upward position or inclined in a rearwardly direction, the three plates 15, 16 and 17 extend in line with each other in the manner described. Upon turning the carriage so as to deflect the former toward the front of the apparatus, the pegs 24 are brought into engagement with pegs 25 which project upwardly from the bottom of the casing and as the forward deflection continues, cause the spindles to turn and so hinge their respective plates back upon the rear face of the plate 16. Stops 26 and 27 are arranged so as to come in contact with the radial pegs 24, as the former 12 completes its forward travel, in order to impart a final pressure of the plates 15 and 17 against the plate 16. To insure the plates 15 and 17 taking up their positions positively, either in line with or hinged upon the plate 16, springs 28 and 29 are provided, each of which has one end secured to a suitable point upon the carriage, while the other is attached to its respective disk at such a point that when carried over the center, the tendency will be to complete the turning. Obviously the like result may be attained by springs arranged in a variety of different ways.

To prevent the plates 15 and 17 from hinging forward beyond the position of their alinement with the plate 16, a stop or bar 30 is secured upon the carriage.

The strips 13 are attached upon the rear sides of the plates 15 and 17 and positioned slightly beyond the inner edges thereof, while upon the forward sides of such plates are secured leaf-springs 31, which are adapted to grip the paper during the folding movements. Thus it will be seen that the strips 13 and leaf-springs 31 being mounted upon their respective plates 15 and 17 will turn therewith during the end-folding movement.

To insure the correct alinement of the former 12, when receiving the sheet from the blade 8, upon one or both ends of the carriage 18 is secured a plate 32, having a slot 33 adapted, when the former 12 is in the correct upward position, to coincide with the guide-slots 10 and with them to receive the blade 8. Thus, should the former 12 be misplaced, the blade 8 will, on entering the slot 33, automatically effect the necessary adjustment. The first quarter fold having now been completed and the sheet placed upon the former 12, the carriage 18 is then turned in the manner explained so as to deflect the former 12 rearwardly toward the end 5 (Fig. 2).

Figure 8:
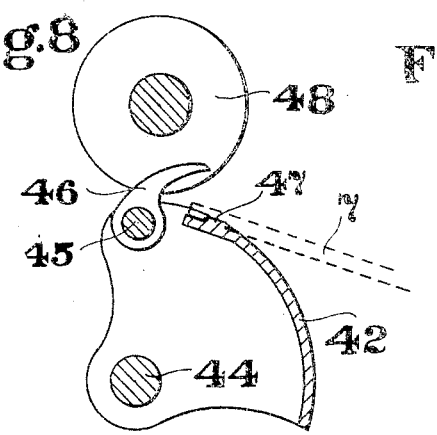
Figure 9:
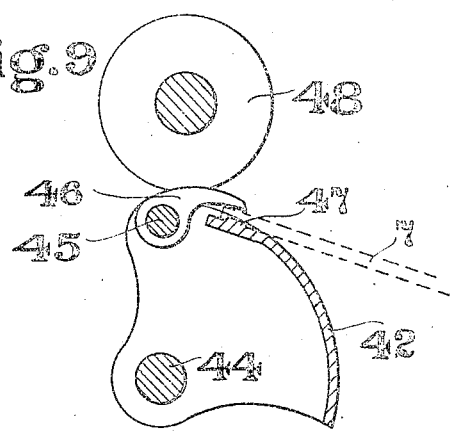

Upon the rear side of the unfolded portion of the sheet is a horizontally disposed blade 34, which is carried upon the forward extremities of a pair of arms 35, the rear or lower ends of which are hingedly secured by means of pivots 36 to the upper ends of a pair of short arms 37 keyed upon and projecting upwardly from a horizontal shaft 38. The said shaft 38 is journaled in bearings upon the end plate 5 near the lower extremity thereof. Projecting laterally from the blade 34 or the arms 35, is a pin 39 adapted to engage with the plate (or plates) 32 for the purpose of controlling the movements of the blade 34. While the former 12 is in the upward or forwardly inclined positions, the pin (or pins) 39 will ride upon the periphery of the plate (or plates) 32, but on inclining the former 12 rearwardly, the pariphery of the plate (or plates) 32 is so curved as to cause the pin (or pins) 39 to enter a groove or race 40 provided in the face of the plate (or plates) 32. The race 40 is so positioned and formed that it will serve to guide the blade 34 downwardly and forwardly upon the former, the arms 35 hinging upon their pivots 36. During the last described movement, the blade 34 engages the unfolded portion of the sheet (Fig. 16) and by carrying it forward, while the former 12 is deflecting rearwardly, serves to wrap such portion of the sheet over the edge of the already folded portion and over the upper edge of the former 12 and deposit the remainder of the sheet upon the forward face of the former 12, thus performing the second fold of the sheet. The second fold being thus completed, the blade 34 is now caused to move forward so as to carry the engaged portion of the sheet in between the face of the former 12 and leaf springs 31 and thus effect the third fold (Fig. 17 and in dotted lines Fig. 6.). The last movement is attained by so turning the shaft 38 as to advance the arms 37 which in turn advance the arms 35 and blade 34. The four quarters of the sheet having been thus folded together, the carriage 18 is turned upon its axis in a forwardly direction in order to bring the former 12 again into its upward position and restore the blade 34 to its original place. The turning of the carriage is continued in the same direction until the former 12 reaches its forward limit, during which movement the plates 15 and 17 and with them the attached lateral ends of the folded sheet are caused to fold back upon the central plate 16 by reason of the pegs 24 coming into mesh with the pegs 25 as hereinbefore explained (Figs. 18 and 19). The folding of the sheet being thus completed, the ejecting means now comes into operation and withdraws the sheet from the former 12 and delivers it upon the outside of the machine. The said ejector comprises a drum or segment 42, arranged within a suitable aperture 43 in the front plate 4 of the casing and carried upon a horizontal shaft 44. Keyed in line upon a shaft 45, which extends parallel with the forward edge of the segment 42 and is journaled in the ends of such segment, are a plurality of rearwardly projecting fingers or grippers 46, adapted when the segment is turned upon its axis to the rearward limit, to close upon the adjacent edge of the folded sheet, as it lies upon the former, and press it down upon the periphery of the segment or upon roughened excrescences 47 provided for the purpose (Figs. 8 and 9). The folded sheet being thus engaged by the grippers, the segment is turned on its axis in a forwardly direction (Fig. 10) so as to withdraw the sheet from the former 12 and deliver it through the aperture 43, when the grippers are caused to release their hold (Fig. 11) and allow the sheet to be removed.

Figure 10:
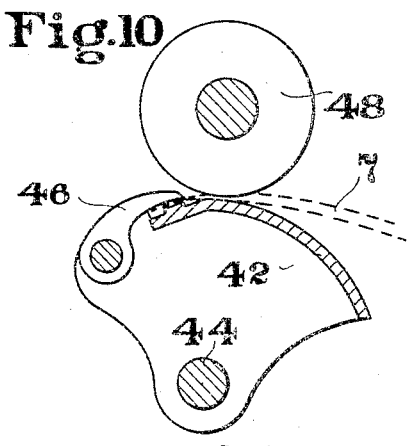
Figure 11:
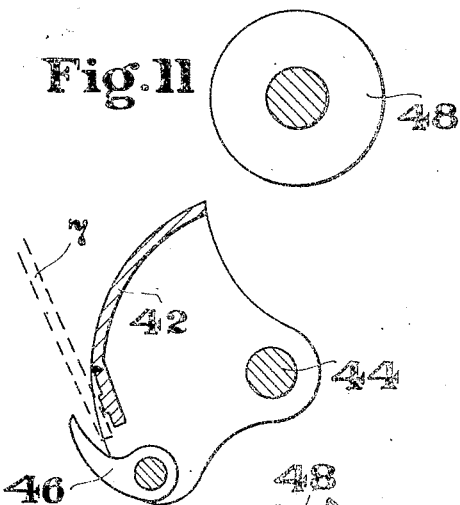

In order to press the folds neatly together, the pressure rolls 48 are arranged upon a suitable axis above and parallel with the segment 42 so that during extraction, the folded sheet will be passed between the rolls and the segment (Fig. 10).

The method of operating the ejector (Fig. 13) comprises a sleeve 49, loosely mounted upon the shaft 44, and provided with a slotted arm 50 which is adapted to operate a crank 51 keyed upon the gripper-shaft 45. By this arrangement the turning of the sleeve 49, in a rearwardly direction, will cause the arm 50 to first carry the crank 51 over until arrested by a stop 52, upon the end of the segment 42, thus raising the grippers in readiness to receive the sheet, as indicated in dotted lines. As the crank is thus locked by the stop 52, it will be seen that further turning of the sleeve in the same direction, will have the effect of turning the segment upon its axis toward the former 12 in the required manner, while the grippers will be maintained in their upward condition in readiness to engage the sheet. Upon reaching the rearward limit, however, the turning of the sleeve 49 is reversed, thus causing the arm 50 to carry the crank away from the stop 52, into the position shown in full lines and thereby causing the grippers to close upon and engage the adjacent edge of the folded sheet; while upon the former 12. To permit of this, notches 53, adapted to receive the grippers are provided in the upper edge of the former. The grippers being now closed, the crank 51 will be incapable of further turning in the same direction, consequently the sleeve 49 will turn the segment 42 forwardly in the required manner until the folded sheet has passed beneath the rolls 48 and through the aperture 43, when the next reversal of such sleeve will cause the grippers to relax their hold and allow the sheet to be discharged.

To effect the rotation of the rolls 48, a gear wheel or segment thereof 54 (Fig. 12) is secured to the end of the segment 42 and is adapted to mesh with a pinion 55 keyed upon the axis of such rolls 48.

The various parts of the machine are all actuated, in their proper sequence, by a common driving shaft 56 journaled in the side plates 2 and 3 and adapted to be operated by means of a handle 57, connected therewith either directly or through suitable gearing 58.

To effect the oscillating movement of the carriage 18 upon its axis, a lever 59 (Fig. 4), adapted to rock upon a pin 60, projecting from the side 2 of the casing, is provided. The forward end of the lever is formed with gear teeth 61, adapted to mesh with the teeth of a pinion 62, keyed upon the carriage 18. The rocking of the lever is controlled by cams 63 and 64, secured upon the shaft 56. It will be understood that as the shaft is turned in the direction indicated by the arrow, the greater radius of the cam 63, being brought to bear upon a pin 65, arranged upon the rear end of the lever, will cause the toothed end thereof to rise, thereby turning the carriage 18 toward the front. Similarly the greater radius of the cam 64, being brought to bear upon a pin 66, arranged upon the lever on the forward side of the pivot 60, will depress the toothed end of the lever and consequently turn the carriage toward the rear.

The means devised for operating the ejector (Fig. 5), comprise a lever 67, adapted to rock upon a pin 68, which projects from the side 3 of the casing. The forward end of such lever is provided with gear teeth 69, adapted to mesh with a pinion 70, keyed upon the sleeve 49. The upward movement of the toothed end of the lever is effected by the periphery of the cam 71, keyed upon the shaft 56, and bearing down upon a pin 72, secured upon the rear end of the lever. The corresponding downward movement of the toothed end of the lever is effected by a pin 73, mounted upon the cam 71, engaging against the rear edge of a projecting lug 74 of the lever.

The method of turning the shaft 38, (Fig. 6) for the purpose of advancing the blade 34 as previously explained, comprises a cam or finger 75 which is keyed upon the shaft 56 and which is adapted, upon turning the shaft, to impinge upon and depress an arm 76 keyed upon the shaft 38. The return movement of the arm 76 is effected by a spring 77, having one end secured to the arm 76 and the other to a fixed point upon the end 5 of the casing. It will be evident that, as an alternative for the shaft 38 and the arms 37 and 76, a bell-crank may be employed in which case the method of operating will be identical with that described.

For the purpose of actuating the blade 8 the rearward extremities of the arms 9 (Fig. 7) are keyed upon the outer extremities of a shaft 78, extending transversely through the casing and journaled in the sides thereof. The down-stroke of the arms and blade, as indicated in dotted lines, is effected by a pin 79, mounted upon a cam 80, itself keyed upon the shaft 56, coming in contact with and bearing down the end of an arm 81 keyed upon said shaft 78. The corresponding up-stroke of the arms and blade is caused by the pressure of the periphery of the cam 80 against the underside of a pin 82, projecting from an arm or finger 83 which is keyed upon the shaft 78. To facilitate the movements of the finger 83 upon the more acute portions of the cam, if thought desirable a pin 84 secured upon the opposite side of the cam 80 adapted to bear against the underside of the finger 83, may be provided. As however, substitutes and equivalents for the before described actuating means for controlling the movements of the various parts from the common driving shaft 56, will suggest themselves to the mind of those skilled in the art, the foregoing are to be regarded as examples and not as forming essential parts of the invention, the scope of which includes the various parts and operations actuated by suitable means.

I claim:

1. In a folding machine of the class described, a framework, an upwardly disposed former supported upon a horizontal axis journaled therein, a plurality of leaf-springs secured against the forward face of said former, a downwardly operating blade co-acting with said former, means for deflecting said former rearwardly, a forwardly operating blade co-acting with said former, and means for advancing the last-said blade between said former and said springs, substantially as and for the purpose specified.

2. In a folding machine of the class described, a framework, a carriage adapted to oscillate upon a horizontal axis therein, a former supported upon said carriage, a co-acting blade operating in guide-slots in said framework, a plate secured upon said carriage, and a slot formed in said plate adapted to aline with said guide-slots and with them to receive said blade when said former is in the upward position, substantially as and for the purpose specified.

3. In a folding machine of the class described, a former supported upon a horizontal carriage, such former comprising a central plate secured upon said carriage and a pair of flanking plates arranged one at either end thereof upon spindles journaled in said carriage adjacent to and parallel with the lateral edges of said central plate, so as to permit of such plates alining with or hinging upon said central portion, substantially as and for the purpose specified.

4. In a folding machine of the class described, a framework, a carriage adapted to oscillate upon a horizontal axis therein, a former comprising a central plate secured upon said carriage and a pair of flanking plates arranged one at either end thereof upon spindles journaled in said carriage adjacent to and parallel with the lateral edges of said central plate, disks mounted on the reverse ends of said spindles and provided with radial projections adapted to intermesh with corresponding projections upon the framework, so as to control the hinging of the plates as the carriage oscillates upon its axis, substantially as and for the purpose specified.

5. In a folding machine of the class described, the combination with a framework, a horizontal axis journaled therein, a former supported upon said axis and upon which the sheet is folded, of means for withdrawing said sheet from the former, comprising, a drum-segment carried upon a horizontal axis, a shaft journaled in the ends of said segment near the forward edge thereof, a plurality of grippers keyed upon said shaft, a crank upon said gripper-shaft, and means for operating said crank so as to turn said segment upon its axis rearwardly with the grippers raised and forwardly with the grippers closed, substantially as specified.

In testimony whereof I have signed my name to this specification in the presence of two subscribing witnesses.

ROBERT BURN.

Witnesses:
GEOFFREY TYNDALL WITHERS,
EDMUND MOUNLYAN SLUDDEN.